United States Patent [19]

Focke et al.

[11] Patent Number: 5,088,878
[45] Date of Patent: Feb. 18, 1992

[54] APPARATUS FOR THE LIFTING OF TRAY PACKS

[75] Inventors: Heinz Focke, Verden; Johannes Holloch, Langwedel, both of Fed. Rep. of Germany

[73] Assignee: Focke & Co. (GmbH & Co), Verden, Fed. Rep. of Germany

[21] Appl. No.: 637,967

[22] Filed: Jan. 9, 1991

Related U.S. Application Data

[63] Continuation of Ser. No. 374,022, Jun. 30, 1989, abandoned.

[30] Foreign Application Priority Data

Jul. 16, 1988 [DE] Fed. Rep. of Germany ....... 3824155

[51] Int. Cl.$^5$ ................................ B66F 9/18
[52] U.S. Cl. .................... 414/627; 294/64.1; 294/65; 414/626; 414/793; 414/744.2; 414/752
[58] Field of Search ........... 414/626, 627, 790.2, 414/793, 793.1, 797, 799, 737, 744.2, 752; 901/40; 294/64.1, 65

[56] References Cited

U.S. PATENT DOCUMENTS

| | | | |
|---|---|---|---|
| 3,387,718 | 6/1968 | Roth et al. | 294/64.1 X |
| 3,404,787 | 10/1968 | Hayford | 414/627 X |
| 3,556,579 | 1/1971 | Seymour-Walker et al. | 294/65 |
| 4,355,936 | 10/1982 | Thomas et al. | 294/65 X |

FOREIGN PATENT DOCUMENTS

| | | | |
|---|---|---|---|
| 120291 | 10/1984 | European Pat. Off. | 294/64.1 |
| 2263477 | 7/1973 | Fed. Rep. of Germany | 294/64.1 |
| 3419913 | 1/1987 | Fed. Rep. of Germany | |
| 2113178 | 8/1983 | United Kingdom | 294/64.1 |

Primary Examiner—Frank E. Werner
Attorney, Agent, or Firm—Sughrue, Mion, Zinn, Macpeak & Seas

[57] ABSTRACT

The lifting and transportation of sensitive articles incapable of bearing a mechanical load, without manual involvement, presents special difficulties in packaging technology. This applies, above all, to tray packs in which articles are arranged standing on a bottom part (11) of small height, without any additional anchoring. For grasping and lifting articles of this type, there is provided a raisable and lowerable suction box (15) which, with suitable dimensions, is placed over the article in the manner of a bell. By the generation of a vacuum within the suction box (15), the article (tray pack 10) is held carefully and can be lifted by means of the suction box (15). Side walls (22) of the suction box (15) are arranged pivotably, to make it easier to place the suction box (15) onto the article.

8 Claims, 5 Drawing Sheets

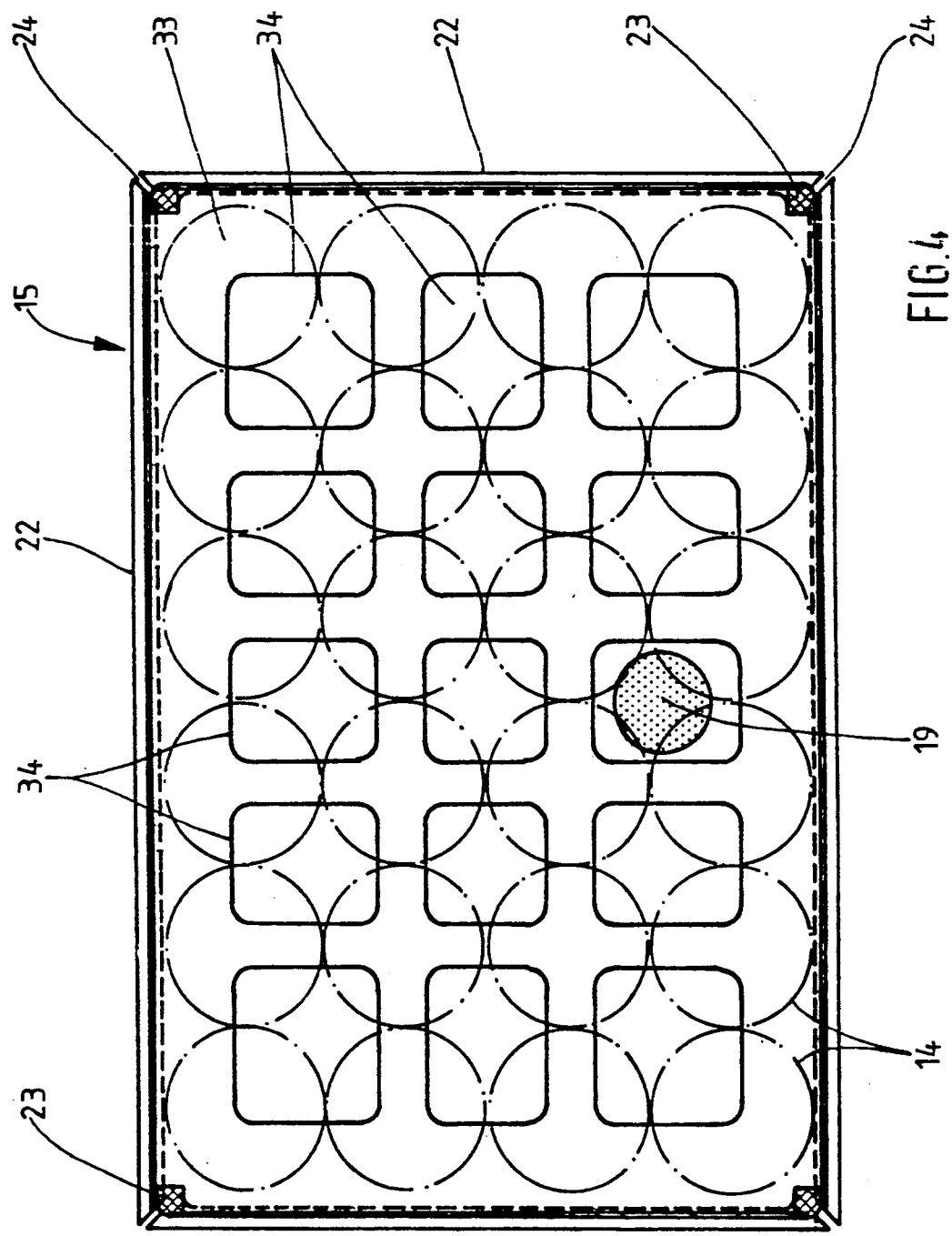

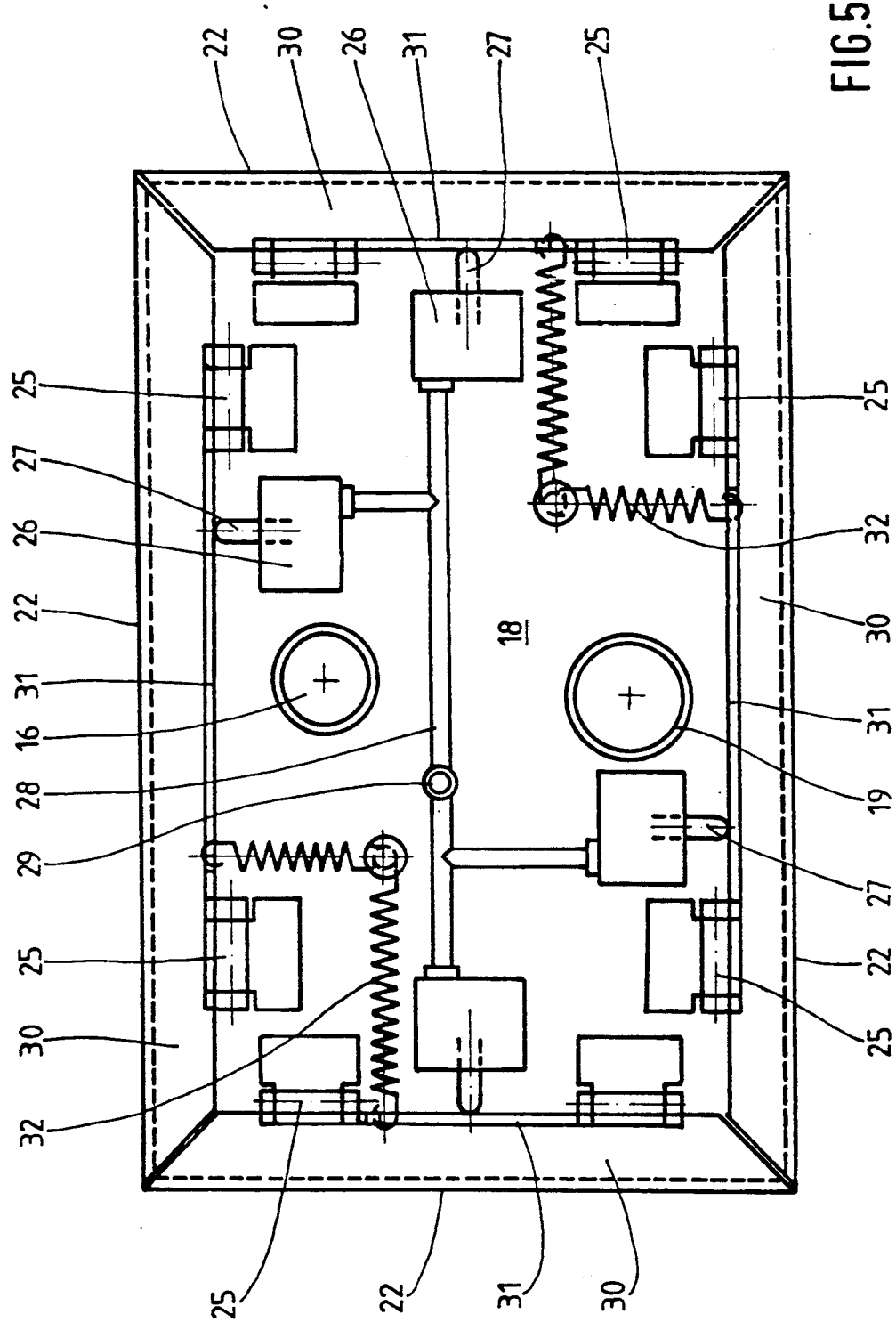

APPARATUS FOR THE LIFTING OF TRAY PACKS

This is a continuation of application No. 07/374,022 filed June 30, 1989, now abandoned.

BACKGROUND OF THE INVENTION

The invention relates to an apparatus for the lifting and/or transportation of articles, especially packs with a bottom part (tray) and with individual pieces arranged on this.

The invention is concerned with measures for the safe lifting of articles presenting conveying difficulties. So-called tray packs are referred to particularly here. These consist of a bottom part (tray) with lateral rims extending all round and of small constructional height. Articles, such as round (cylindrical), cuboid or otherwise shaped individual packs, lie or stand on the bottom part. The abovementioned articles (individual packs) are not secured on the bottom part, but if appropriate are surrounded by a wrapping (film).

During the lifting and transportation of pack units of this type, it is necessary to allow for the relatively low stability in respect of mechanical loads, but also the fact that the individual packs are not anchored on the bottom part. It is especially difficult to handle pack units in which the individual packs are sensitive to mechanical stresses, for example tray packs with biscuit rolls.

SUMMARY OF THE INVENTION

The object on which the invention is based is to grasp articles or packs of this type securely and reliably for lifting and transportation, without damaging the pack itself or its content.

To achieve this object, the apparatus according to the invention is characterized by a raisable and lowerable, at least downwardly open suction box which is arranged on a lifting member or on a conveyor and which can be placed over the article (pack) and grasps this as a result of suction air in the suction box. The latter is coordinated with the dimensions, especially with the plan form and plan size of the article to be lifted. The suction air is transmitted to a carrying part of the article, especially to the bottom part, thus generating the necessary supporting force for lifting the article. The suction box does not have to be matched exactly in terms of dimensions to the article to be lifted. Leakage air can be allowed for, since the air throughput is sufficient if a suction unit of appropriate size is used. The suction-air stream is preferably generated by a fan which ensures a sufficiently high air throughput at a low outlay in terms of energy.

According to a further proposal of the invention, the suction box is equipped with movable or deformable sealing means which, in the lifting position of the suction box, can be pressed or sucked against faces of the article, especially against side faces or the lateral rims of the tray. Because the sealing means are laid against the article by suction, an additional retaining or supporting force is generated as a result of the frictional connection.

According to the invention, the suction box is equipped with tiltable side walls which, for placing the suction box onto the article, are pivotable into a spreading position and thereafter into an essentially vertical position. The tiltable side walls are attached to an upper supporting plate, on which the lifting member, especially an arm of a robot, is also arranged. A suction connection also adjoins the supporting plate. Furthermore, attached to the top of the latter are members for actuating the tiltable side walls.

Further features of the invention relate to the design of the suction box, especially where the sealing is concerned.

An exemplary embodiment of the invention is explained in detail below by means of the drawings. In these:

BRIEF DESCRIPTION OF THE DRAWINGS

FIG. 4 shows a bottom view of the suction box of the apparatus, and FIG. 5 shows a top view of the suction box.

DETAILED DESCRIPTION OF A PREFERRED EMBODIMENT

Figure 1:
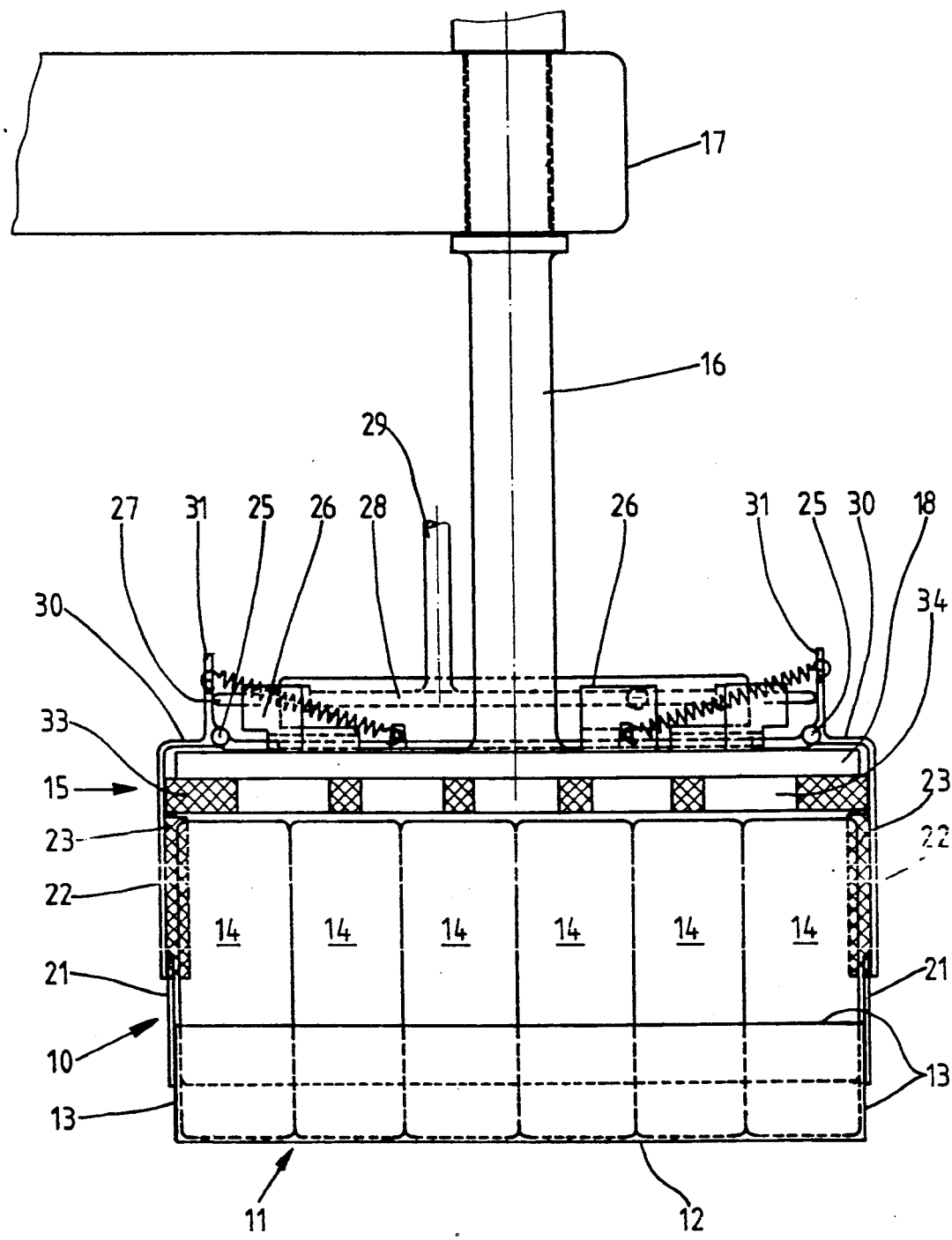
FIG. 1 shows, in cross-section, an apparatus for the lifting of a tray pack, as part of a robot.

The exemplary embodiment illustrated relates to the handling of especially critical articles, particularly cuboid tray packs 10. These conventionally consist of a tray or bottom part 11. This is composed of a bottom wall 12 and of a lateral rim 13 extending all round. Articles, in the present case biscuit rolls 14, stand on the bottom wall 12 and are laterally surrounded by the lateral rim 13. The packaged articles, that is to say the biscuit rolls 14, predominantly project above the bottom part 11. The tray pack 10 thus designed can be wrapped in a film, but is conventionally open, as illustrated in the exemplary embodiment illustrated.

The tray pack 10 is to be transported, especially lifted and deposited, for example on a pallet, as a unit. This loading or transport operation is to take place automatically, that is to say without any manual involvement.

For this purpose, there is a lifting member provided which can be subjected to suction air, in particular a suction box 15 for grasping and holding the tray pack 10 during a lifting or transport movement. To this effect, a suction box 15 is arranged on a conveyor member. In the exemplary embodiment illustrated, the suction box 15 is connected, via a vertical supporting rod 16, to a jib or arm 17 of a lifting conveyor, especially a robot. An example of a suitable loading robot is illustrated and described in DE-A-3 638 991.

For grasping the tray pack 10, the suction box 15 is slipped over this from above. A vacuum is then generated within the suction box 15, with the result that the tray pack 10 is held in or on the suction box 15. The suction air or vacuum at the same time acts on the bottom part 11, especially on the bottom wall 12, and carries this together with the content.

In the present case, the downwardly open suction box 15 consists of an upper supporting plate 18. The supporting rod 16 is attached to this, particularly to its top. Furthermore, the supporting plate 18 is equipped with a suction connection, particularly a suction pipe 19, which is connected to the interior of the suction box 15 via an orifice 20. The suction pipe 19 is connected to a vacuum source not shown here, especially to a fan, which can suck up large quantities of air under a relatively low vacuum.

Moreover, the suction box 15 is equipped with lateral sealing means which, in the working or lifting position of the suction box 15, rest sealingly as a result of the vacuum against the bottom part 11, in particular against its lateral rim 13. In the present exemplary embodiment, elastic sealing strips 21 are attached to the lower edge of side walls 22 of the suction box 15. The side walls 22 terminate at a distance above the bottom part 11, whilst the elastically deformable sealing strips 21 extend as far as the lateral rim 13 of the bottom part 11. As a result of a vacuum within the suction box 15, the sealing strips 21 are laid sealingly against the lateral rim 13 and therefore at the same time transmit a supporting force to the bottom part 11 as a result of a frictional connection.

The number and design of the side walls 22 are matched to the plan form of the suction box 15. On the rectangular suction box 15 shown here, four side walls 22 are arranged opposite one another in pairs. The side walls 22 extend as far as vertical corner edges of the suction box 15. Arranged in the region of these corner edges are vertical sealing means, particularly sealing profiles 23 made of elastic material. These serve for sealing off corner gaps 24 in the region of adjacent side walls 22 abutting one another.

To place the suction box onto an article (tray pack 10), the suction box is brought into a funnel-shaped form diverging downwards. For this purpose, the four side walls 22 are attached movably, particularly tiltably to the supporting plate 18. Each side wall 22 is mounted by means of an edge-parallel hinge bearing 25 on the supporting plate 18, particularly on the top of the latter adjacent to the edge. The side walls 22 are pivotable about the associated hinge bearing 25, in particular out of a diverging initial position according to FIG. 2 into the closing or carrying position according to FIG. 1 and FIGS. 3 to 5.

In order to execute the pivoting movements, the side walls 22 are stressed by means of actuating members. In the exemplary embodiment illustrated, each side wall 22 has assigned to it as an actuating member a small actuating cylinder 26 which can be subjected, for example, to compressed air. A piston rod 27 of the latter is moved up against a stop of the side wall 22 in order to pivot the side wall 22 out of the inclined position into the vertical closing position. The actuating cylinders 26 assigned to the four side walls 22 are connected to one another via a system of pressure-medium lines 28 and to a central compressed-air unit (not shown) via a main line 29.

In the present exemplary embodiment, the side walls 22 are of angular cross-section. One leg 30 adjoining the side wall 22 at right-angles extends over approximately the entire length of the side walls 22 on top of the supporting plate 18. The legs 30 abutting one another are mitred at the corners.

Each leg 30 is mounted tiltably on the top of the supporting plate 18 by means of two hinge bearings 25 arranged at a distance from one another. Located between the hinge bearings 25 are the actuating cylinders 26. These or their piston rods 27 act on a vertical stop wall 31 of the side walls 22. The stop walls 31 are attached respectively to the legs 30, specifically at right-angles to these. In the exemplary embodiment shown, each stop wall 31 extends in the region between the hinge bearings 25 of a particular side wall 22. The piston rods 27 act at a distance from the hinge bearing 25 on the vertical or obliquely directed stop walls 31 in order to pivot the side walls 22.

In the present exemplary embodiment, the actuating cylinders 26 cause the side walls 22 to be shifted into the vertical (closing) position. The return to the inclined or diverging initial position (FIG. 2) is ensured by means of restoring springs 32 which are fastened to each side wall 22 or to the stop wall 31 of this, on the one hand, and to the supporting plate 18, on the other hand. The restoring springs 32 are prestressed in the direction of the diverging position of the side walls 22.

In the example shown, attached to the underside of the supporting plate 18, that is to say confronting the article (tray pack 10), is an elastic rest 33. This consists, for example, of elastic foam material. The rest 33 is designed in the form of a grid, with a plurality of recesses 34. Air can be sucked up by the suction pipe 19 through one of these recesses 34.

Figure 2:
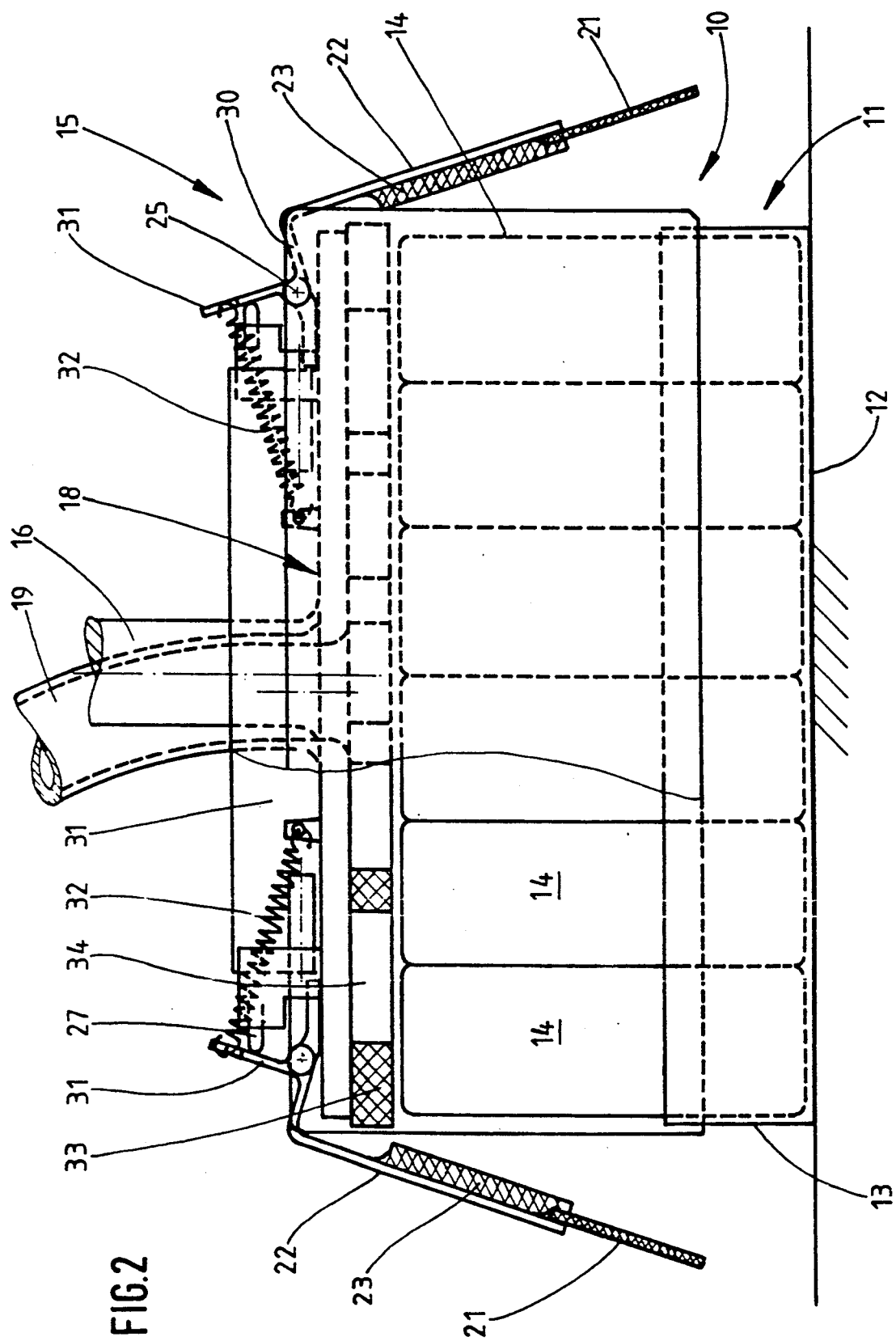
FIG. 2 shows a lifting unit (suction box) of the apparatus according to FIG. 1 as a detail, with the side walls spread open.
Figure 3:
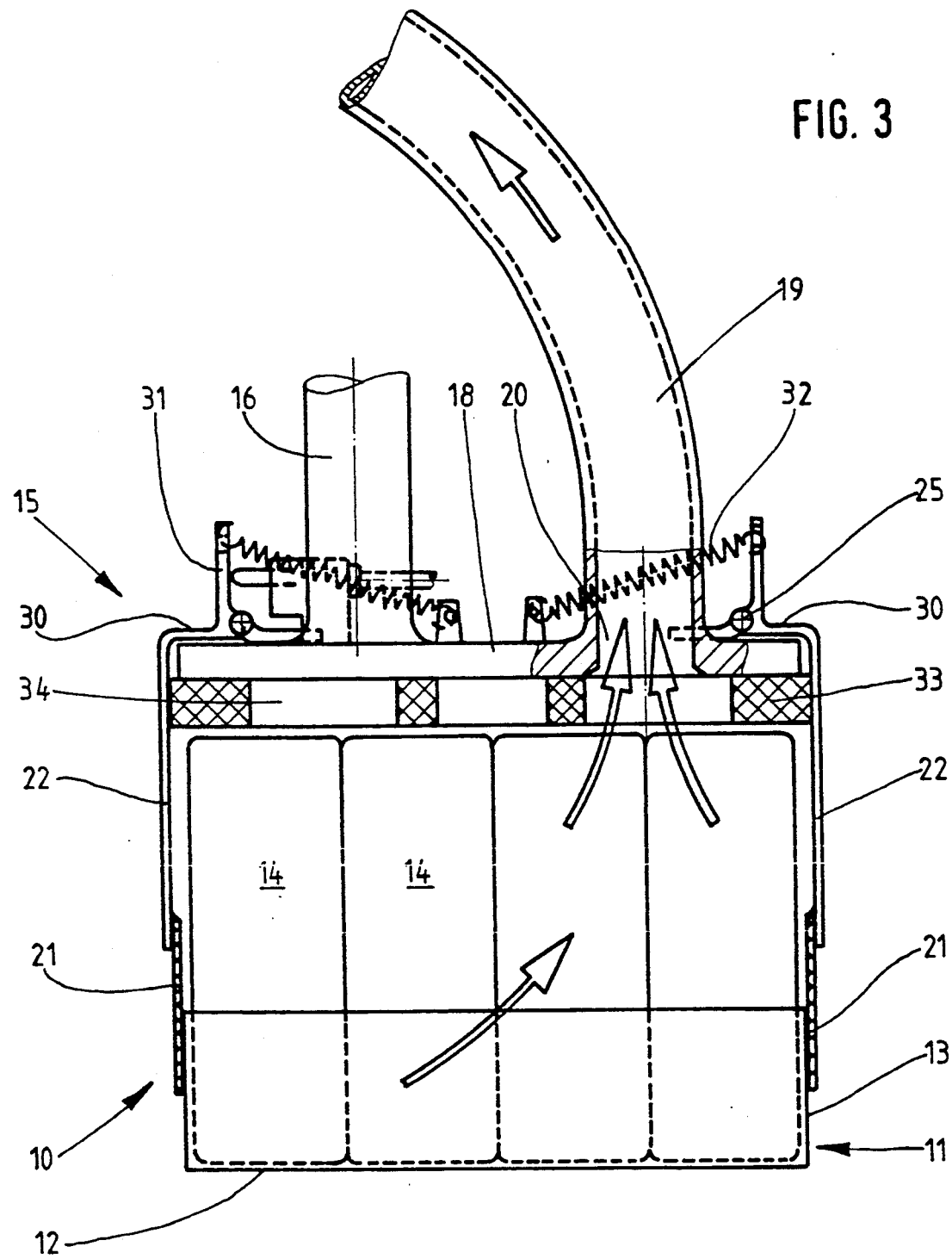
FIG. 3 shows a representation corresponding to that of FIG. 2, in a transverse sectional plane offset at 90°, with the side walls directed vertically.

For the lifting of articles, for example tray packs 10, the procedure with the lifting apparatus described is that the suction box 15 is lowered onto the article by an appropriate actuation of a robot or the like, with the side walls 22 spread open (FIG. 2). The supporting plate 18 or the rest 33 attached to this is located at a short distance above the tray pack 10, so that the latter is not touched by the suction box 15 in the lower position of the latter. The side walls 22 are now pivoted into the vertical position, with the result that the sealing strips 21 come to bear on the lateral rim 13. By the generation of a vacuum within the suction box 15, the sealing strips 21 are pressed against the lateral rim 13. As a result of the effect of the vacuum in the suction box 15 and additionally as a result of frictional forces between the sealing strips 21 and lateral rim 13, the tray pack 10 can now be lifted, transported and deposited at the desired location. During the depositing operation, the suction box 15 is ventilated. The side walls 22 are pivoted into the inclined position, so that the suction box 15 can be lifted off from the tray pack 10 again, without touching this.

What is claimed is:

1. In an apparatus for the lifting and transportation of cuboidal articles, said apparatus comprising a raisable and lowerable, downwardly open suction box (15) which is mounted on a lifting and conveying member, and which is placeable over a article (10) to grasp the article as a result of a vacuum in said suction box (15); said suction box (15) having a horizontally directed upper supporting plate (18) and movable side walls (22) which are movable out of an initial inclined open position, in which a cross-section of the suction box (15) is widened to be larger than that of an article, into a vertical upright closed position corresponding to dimensions of the article (10) to be lifted, said side walls (22) being provided with elastic sealing strips (21) movable against upright side faces of the article (10); the improvement comprising:

a plurality of hinge means (25), mounted on said supporting plate, for pivotably mounting said side walls (22) on said supporting plate (18); and actuating means (26), coupled to said walls (22), for pivoting said side walls (22) about said hinge means (25) between said initial open position and said vertical closed position; wherein said hinge means (25) and said actuating means (26) are arranged wholly on a top of said supporting plate (18) and wholly within horizontal extremities thereof.

2. The apparatus according to claim 1, wherein said hinge means (25) are arranged such that they extend edge-parallel on the top of said supporting plate (18) adjacent to edges thereof.

3. The apparatus according to claim 1, wherein each of said side walls (22) has a vertical stop wall (31), and wherein said actuating means comprises cylinder means (26) and piston rod means (27) for acting on the vertical stop walls (31) to effect closing pivoting movement of said side walls (22).

4. The apparatus according to claim 3, wherein said suction box (15) comprises supporting members including a supporting rod (16), a suction pipe (19), and a pressure medium-lines (28, 29) for said cylinder means (26), said supporting members being arranged on the top of said horizontally directed supporting plate (18) which has at least one orifice (20) for the connection of the suction pipe (19).

5. The apparatus according to claim 4, further comprising an upholstery rest (33) made of elastic material and arranged on a bottom of said supporting plate (18).

6. The apparatus according to claim 1 or 3, further comprising restraining spring means (32) for preloading said side walls (22) in the direction of the open position.

7. The apparatus according to claim 1, wherein the articles are tray packs each provided with a bottom wall (12) having a bottom part (11) in which individual objects stand, and with a peripheral rim (13) which surrounds a bottom region of the objects;
  said side walls having a vertical length which stops short of said rim (13) when said suction box (15) is placed over the trap pack (10);
  said vertically extending elastic sealing strips (21) having a vertical length which extends into a region of said rim (13) when said suction box (15) is placed over said trap pack (10) so that, when there is suction in said suction box (15), only said sealing strips (21) sealingly engage said rim (13) in a region below said side walls (22).

8. The apparatus according to claim 7, wherein each of the side walls (22) includes sealing means (23) for air-sealing vertical edges of adjacent side walls (22) when said side walls (22) are in said upright vertical position.

* * * * *